United States Patent
Erpenbeck (10) Patent No.: US 10,914,331 B2
(45) Date of Patent: Feb. 9, 2021

(54) DEVICE FOR COMPENSATING FOR TOLERANCES

(71) Applicant: WITTE Automotive GmbH, Velbert (DE)

(72) Inventor: Till Erpenbeck, Velbert (DE)

(73) Assignee: WITTE Automotive GmbH, Velbert (DE)

( * ) Notice: Subject to any disclaimer, the term of this patent is extended or adjusted under 35 U.S.C. 154(b) by 215 days.

(21) Appl. No.: 16/094,834

(22) PCT Filed: Apr. 18, 2017

(86) PCT No.: PCT/EP2017/059117
§ 371 (c)(1),
(2) Date: Oct. 18, 2018

(87) PCT Pub. No.: WO2017/182434
PCT Pub. Date: Oct. 26, 2017

(65) Prior Publication Data
US 2019/0120267 A1 Apr. 25, 2019

(30) Foreign Application Priority Data

Apr. 20, 2016 (DE) .......................... 10 2016 107 357

(51) Int. Cl.
*F16B 5/00* (2006.01)
*F16B 21/08* (2006.01)
(Continued)

(52) U.S. Cl.
CPC .......... *F16B 5/0628* (2013.01); *F16B 5/0233* (2013.01); *F16B 5/0642* (2013.01);
(Continued)

(58) Field of Classification Search
CPC .... F16B 5/0233; F16B 21/086; F16B 21/084; F16B 37/043; F16B 5/0628
(Continued)

(56) References Cited

U.S. PATENT DOCUMENTS 2,667,200 A * 1/1954 Bedford, Jr. ............ F16B 37/14
411/173
5,454,479 A * 10/1995 Kraus .................... B62D 25/24
220/787
(Continued)

FOREIGN PATENT DOCUMENTS

| CN | 101251142 A | 8/2008 |
|---|---|---|
| CN | 101324246 A | 12/2008 |

(Continued)

OTHER PUBLICATIONS

English Translation of International Search Report for International Application No. PCT/EP2017/059117 dated Jul. 21, 2017, 2 pages.
(Continued)

*Primary Examiner* — Flemming Saether
(74) *Attorney, Agent, or Firm* — Wiggin and Dana LLP; Gregory S. Rosenblatt; Thomas M. Landman (57) ABSTRACT

The invention relates to an apparatus for compensating tolerances between a first component and a second component comprising a base element that defines a central longitudinal axis, a compensation element in threaded engagement with the base element, and a holding element fixedly connected to the base element to hold the apparatus at the first component, wherein the holding element comprises a base body, characterized in that a support wall extending from a peripheral surface of the base body has an upper margin remote from the second component in the state of the apparatus held at the first component and comprises a deflection section that is deflectable against a return force (Continued)

along a deflection line not oriented perpendicular to the central longitudinal axis.

14 Claims, 4 Drawing Sheets

(51) Int. Cl.
*F16B 5/06* (2006.01)
*F16B 5/02* (2006.01)

(52) U.S. Cl.
CPC .......... *F16B 5/0657* (2013.01); *F16B 5/0664* (2013.01); *F16B 21/084* (2013.01); *F16B 2005/0671* (2013.01)

(58) Field of Classification Search
USPC .......................................... 411/546, 508, 182
See application file for complete search history.

(56) References Cited

U.S. PATENT DOCUMENTS

| | | | | |
|---|---|---|---|---|
| 5,658,110 | A * | 8/1997 | Kraus | B62D 25/24 411/510 |
| 6,857,168 | B2 * | 2/2005 | Lubera | B60N 3/026 24/293 |
| 7,488,135 | B2 * | 2/2009 | Hasegawa | F16B 5/0233 403/167 |
| 8,764,337 | B2 * | 7/2014 | Binder | F16B 5/0233 403/343 |
| 8,894,340 | B2 * | 11/2014 | Kamiya | F16B 21/086 411/508 |
| 9,127,701 | B2 * | 9/2015 | Tung | F16B 5/065 |
| 2019/0113062 | A1 * | 4/2019 | Liu | F16B 13/124 |

FOREIGN PATENT DOCUMENTS

| | | |
|---|---|---|
| CN | 103994131 A | 8/2014 |
| DE | 3304569 C1 | 7/1984 |
| DE | 102012007996 A1 | 10/2013 |
| DE | 102012221228 A1 | 5/2014 |
| DE | 102015013598 A1 | 4/2017 |
| EP | 0456187 A1 | 11/1991 |
| EP | 1297265 B1 | 10/2005 |
| EP | 2376791 B1 | 11/2012 |
| EP | 2003346 A2 | 10/2018 |
| JP | H0771601 A | 3/1995 |

OTHER PUBLICATIONS

English Translation of Written Opinion for International Application No. PCT/EP2017/059117 dated Jul. 21, 2017, 4 pages.

Search Report from German Patent Office for German Application No. 102016107357.1 dated Feb. 2, 2017, 2 pages, no English translation available.

Office Action and Search Report from China National Intellectual Property Administration (CNIPA) for Chinese Application No. 201780025450.8 dated Dec. 25, 2019; no English translation available.

* cited by examiner

DEVICE FOR COMPENSATING FOR TOLERANCES

CROSS-REFERENCES TO RELATED APPLICATIONS

This application is a 371 National Phase Application of Patent Application PCT/EP2017/059117, filed on Apr. 18, 2017, which claims the priority of German Application No. 102016107357.1 filed on Apr. 20, 2016, each of which is incorporated herein by reference, in their entirety.

BACKGROUND OF THE INVENTION

The present invention relates to an apparatus for compensating tolerances between a first component and a second component comprising a base element that defines a central longitudinal axis, a compensation element that is in threaded engagement with the base element, and a holding element that is fixedly connected to the base element for holding the apparatus at the first component, wherein the holding apparatus comprises a base body.

Such an apparatus is generally known and is used in the automotive sector, for example in the installation of a rail at the roof of a vehicle. The apparatus here specifically serves to compensate tolerances in the direction of the central longitudinal axis between a roof panel of the motor vehicle (first component) and a support structure (second component) disposed thereunder. For this purpose, the apparatus is clipped by means of its holding element into a cut-out of the roof panel provided therefor and the tolerance element is unscrewed from the base element by so much until it is downwardly supported at the support structure disposed thereunder and clips of the holding element engaging beneath the roof panel are upwardly supported at the roof panel. A section of the base element here projects upwardly beyond the roof panel and forms a contact surface for the rail to be installed.

The clips of the holding element are comparatively soft so that the apparatus can easily be clipped into the cut-out of the roof skin. This is, however, problematic to the extent that the clips can correspondingly be easily deformed when the tolerance element already in engagement with the support structure is unscrewed further from the base element, which can occur with elevated torques that can in particular occur on the unscrewing of the compensation element by means of a tool expressly provided for this purpose. Such an unwanted deformation of the clips has the result that the base element projects further upwardly beyond the roof panel in an undefined manner, which in turn means that the rail that is typically fixed to the roof by means of a plurality of apparatuses has an irregular clearance toward the roof panel which not only impairs the outward appearance, but also the function of a seal arranged between the rail and the roof panel.

BRIEF SUMMARY OF THE INVENTION

It is an object of the invention to provide an apparatus of the initially named kind that can be installed with a small effort and that ensures a defined overhang of the base element over the first component on a side remote from the second component in the installed state.

The object is in particular satisfied in that a support wall extending from a peripheral surface of the base body has an upper margin remote from the second component in the state of the apparatus held at the first component and that comprises a deflection section that can be deflected against a return force along a deflection line not oriented perpendicular to the central longitudinal axis.

It is a general idea underlying the invention to lead off a force exerted on the base element and on the holding element in the installed state of the apparatus by the support of the compensation element at the second component via a support wall formed at the base element to the first component that forms a deflection section that is deflectable along a deflection line not oriented perpendicular to the central longitudinal axis and preferably extending diagonally across the support wall. The deflection section can be deflected with a comparatively small effort in a direction transversely to the central longitudinal axis required for the installation of the apparatus in the cut-out of the first component and can be clipped into the first component due to the extent of the deflection line not perpendicular to the central longitudinal axis, At the same time, the support wall has a higher stability viewed in the direction of the central longitudinal axis and can thus transmit higher forces in this direction without deforming in an unwanted manner. The base element of the apparatus held at the first component and supported at the second component as a result therefore always projects over the first component by a defined amount on the side remote from the second component. A rail having a clearance constant over its length can thus, for example, be simply installed at the roof of a motor vehicle by using a plurality of apparatus in accordance with the invention.

Advantageous embodiments of the invention can be seen from the description and from the drawings.

The base element, the compensation element, and the holding element can be produced from a plastic such as polyoxymethylene. It is, however, also conceivable in particular to produce the base element and the compensation element from a metal material.

The base element and the holding element are preferably fixedly connected, for example pressed, to one another in a shape matched and/or force fitted manner. It is, however, also conceivable to connect the base material and the holding material with material continuity, for example to adhesively bond them. It is moreover also possible in principle to form the base element and the holding element in one piece.

The support wall advantageously has a constant wall thickness. It is, however, also conceivable that the support wall has different wall thicknesses, with the wall thickness in particular being able to become outwardly narrower for a simpler introduction of the apparatus into the cut-out of the first component. It is also conceivable that the deflection section has a different, in particular thinner, wall thickness than a section of the support wall that is not deflected.

The support wall preferably has an outer wall with a component of extent in parallel with the central longitudinal axis with the outer margin and the deflection line being spaced apart from one another. The spacing between the outer margin and the deflection line defines a lever length.

The spacing between the outer margin and the deflection line advantageously increases in the direction of the upper margin. Since less force has to be applied to deflect a lever with a larger lever length, the force applied to deflect the deflection section in the direction of the upper margin decreases, from which a degressive force progression results on the clipping of the apparatus into the first component.

The outer margin furthermore does not necessarily have to extend in parallel with the central longitudinal axis. A spacing between the outer margin and the central longitudinal axis can in particular increase in the direction of the upper margin.

In accordance with a first embodiment, the deflection line extends, starting from a region in which the upper margin projects from the base body, diagonally across the support wall in the direction of the outer margin.

A pair of support walls spaced apart from one another in the peripheral direction of the base body is advantageously provided. A respective pair of support walls is in particular provided at oppositely disposed sides of the base body. It has proven to be favorable if two pairs of support walls are arranged diametrically with respect to one another at the base body, with it also being possible to arrange two pairs of support walls non-diametrically with respect to one another. It is generally also conceivable that more than two pairs of support walls extend from a peripheral surface of the base body.

It is additionally conceivable only to form one support wall of a pair of support walls with a deflection section.

The clipping of the apparatus into the cut-out of the first component is additionally facilitated in that the spacing between the support walls of a pair of support walls increases in the direction of the upper margin, that is the support walls move apart upwardly so-to-say.

A secure clipping of the apparatus at the first component is additionally promoted when the spacing between the support walls of a pair of support walls increases outwardly starting from the base body. The support walls of a pair of support walls in other words spread outwardly starting from the base body, with their deflection sections being able to be pressed together for the introduction of the apparatus into the cut-out. It is hereby ensured with a correspondingly adapted contour of the cut-out that the upper margins of the support walls forming support surfaces at least partly come to lie beneath a region of the first component bounding the cutout and can be effectively supported thereat.

The support walls of a pair of support walls are preferably curved away from one another. It is ensured by the extent of the curvature that only the outer margins of the support walls run onto the margin of the first component bounding the cut-out, whereby a deflection of the deflection sections takes place with a maximum lever arm on the introduction of the apparatus into the cut-out, which minimizes the force to be applied for clipping in the apparatus.

Since the part of the cut-out receiving the base body of the holding element will always be somewhat larger in dimension than the base body, a rotation by an angle μ of the apparatus clipped into the cut-out about the central longitudinal axis can occur when the compensation element is unscrewed from the base element. To ensure an ideal support of the support walls at the first component despite such a rotation, the support walls can be aligned at different angles α, β to a plane that includes the central longitudinal axis and that extends centrally between origins of the support walls at the base body. In this respect, the angle α that is at the front in the direction of rotation is advantageously smaller by the angle μ than the angle β so that the support walls are aligned at least approximately symmetrically with the cut-out after a rotation of the apparatus by the angle μ. A region of a support wall is defined as the origin here at which said support wall projects from the base body.

A set of first rotational boundary surfaces is advantageously provided to bound a rotation of the apparatus received in the cut-out of the first component about the central longitudinal axis that can be caused by the unscrewing of the compensation element from the base element in particular to bound the rotational movement toward the mentioned angle μ.

In addition, a set of second rotational boundary surfaces can be provided at the holding element to also bound a rotation of the apparatus received in the cut-out of the first component about the central longitudinal axis in a direction that is opposite to a rotational movement caused by the unscrewing of the compensation element from the base element.

The holding element can furthermore form a protrusion at an end of the base body remote from the second component, said protrusion serving together with the upper margin of the support wall to secure the apparatus at the first component. In this respect, the protrusion and the upper margin are spaced apart from one another such that they can accept a marginal region of the first component defining the cut-out between them. The spacing between the protrusion and the upper margin is ideally at least approximately adapted to the thickness of the marginal region of the first component.

The set of first rotational boundary surfaces and/or the set of second rotational boundary surfaces is/are advantageously formed between the protrusion and the upper margin viewed in the direction of the central longitudinal axis.

In accordance with a second embodiment, the base body defines a frame having a pair of mutually oppositely disposed frame walls in the peripheral direction, with a support wall spaced apart from a respective frame wall being associated therewith. Each support wall can here be substantially aligned in parallel with its frame wall.

Each support wall preferably comprises two deflection sections that face away from one another and that are defined by a web extending in the direction of the central longitudinal axis and connecting the support wall and the frame wall and by a console facing the second component and connecting the support wall and the frame wall.

The deflection line of each deflection section preferably extends from an end of the web remote from the second component diagonally across the support wall in the direction of a region of an outer margin of the support wall facing the second component.

To prevent the apparatus from falling through the cut-out of the first component, a prolongation extends outwardly from each deflection section. The prolongations of a support wall preferably merge into a protrusion that connects the prolongations and that can project over a marginal region of the first component bounding the cut-out.

A counter-bearing is furthermore formed at each deflection section and forms a support surface spaced apart from a prolongation viewed in the direction of the central longitudinal axis. The prolongations and the counter-bearings of a support wall serve to secure the apparatus at the first component. In this respect, the protrusions and the support surfaces of the counter-bearings are spaced apart from one another such that they can receive a marginal region of the first component defining the cut-out between them. The spacing between the prolongation and the support surface is ideally at least approximately adapted to the thickness of the marginal region of the first component.

Resilient positioning surfaces can be provided for the radial fixing of the holding element to the first component to support the apparatus received in the cut-out of the first component against a margin of the first component bounding the cut-out.

The positioning surfaces preferably comprise a set of first positioning surfaces that are formed at the support wall between the counter-bearing and the prolongation of each deflection section. Additionally or alternatively, a set of second positioning surfaces can be provided that are formed at extensions of frame walls that face the support walls and that extend at least approximately perpendicular to the support walls.

Engagement features, in particular for a tool such as pliers, can be provided at the prolongations by which the deflection sections can be deflected against their return force for the dismantling of the apparatus from the first component. The protrusion can here form a protection for the first component against damage by the tool.

BRIEF DESCRIPTION OF THE DRAWINGS

The invention will be described in the following purely by way of example with reference to possible embodiments and to the enclosed drawings. There are shown.

DETAILED DESCRIPTION OF THE INVENTION

Figure 1:
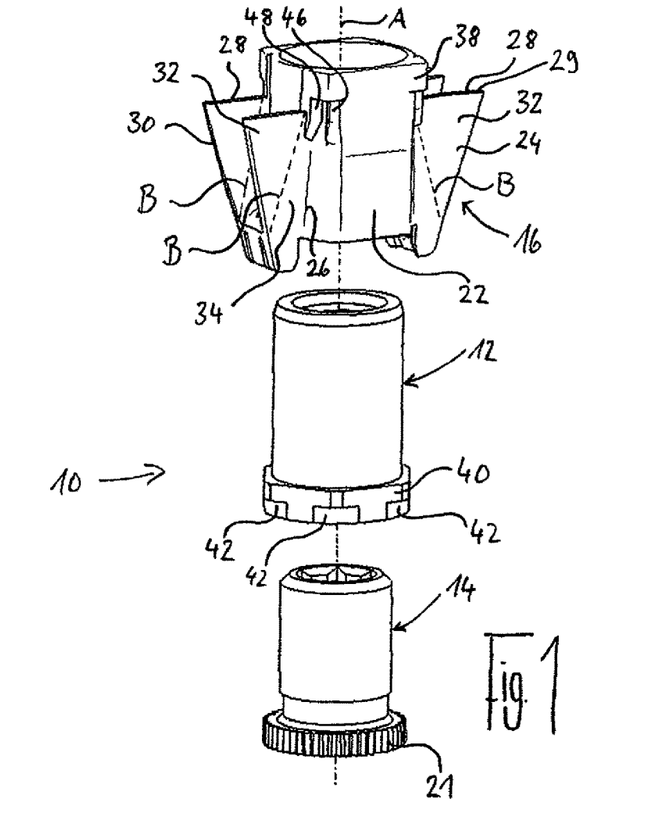
FIG. 1 an exploded representation of an apparatus in accordance with the invention in accordance with a first embodiment.

An apparatus 10 in accordance with the invention in accordance with a first embodiment is shown in FIG. 1. The apparatus 10 comprises a base element 12 that defines a central longitudinal axis A, a compensation element 14, and a holding element 16 and serves to compensate tolerances between a first component 18, e.g. a roof panel of a motor vehicle, and a second component 20, e.g. a support structure disposed beneath the roof panel (see FIG. 4).

Figure 4:
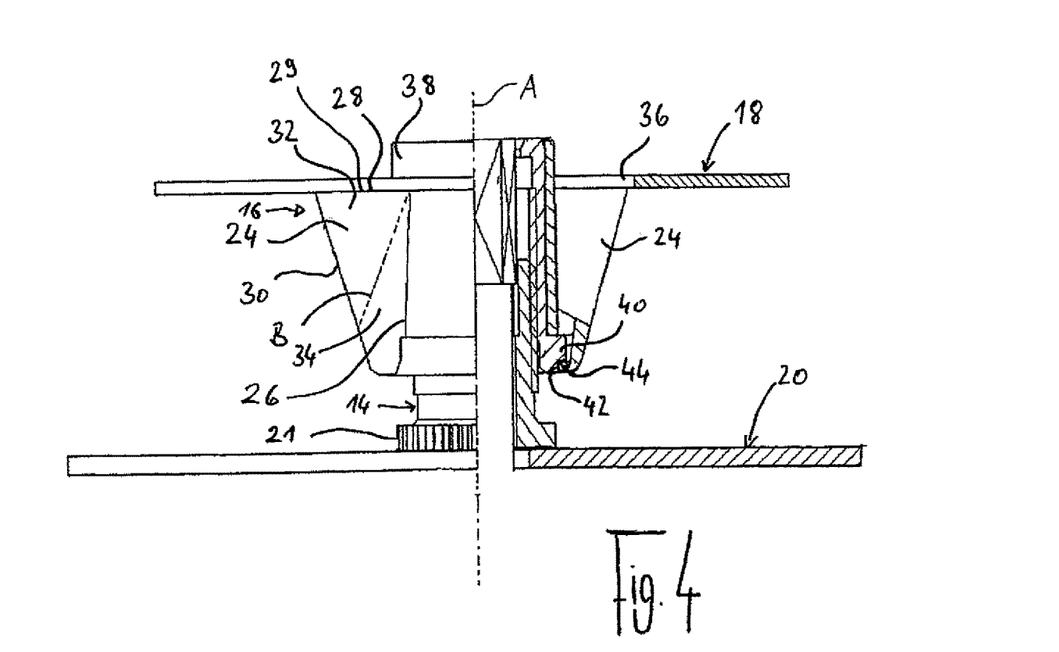
FIG. 4 a part sectional view of the apparatus of FIG. 1, with the apparatus being received in a cut-out of a first component and with a compensation element of the apparatus being supported at a second component.

The base element 12 and the compensation element 14 are in threaded engagement with one another so that the compensation element 14 can be unscrewed from the base element 12 in the direction of the second component 20 by rotating the compensation element about the central longitudinal axis A to be supported there by means of a stop washer 21 (FIG. 4).

The holding element 16 comprises a base body 22 that is pressed onto the base element 12 and/or that is adhesively bonded thereto and that has two diametrically arranged pairs of support walls 24 that form an origin 26 where they project from the base body 22. The number of support walls 24 can naturally differ from four. The support walls 24 can also be formed at a different point at the base body 22.

The support walls 24 have a upper margin 28 that is remote from the stop washer 21 or that is respectively remote from the second component 20 in the installed state of the apparatus and that defines a support surface 29 here. Each of the support walls 24 furthermore has an outer margin 30 and comprises a deflection section 32 that can be deflected against a return force and that is separated from a rigid section 34 by a deflection line B.

Figure 3:
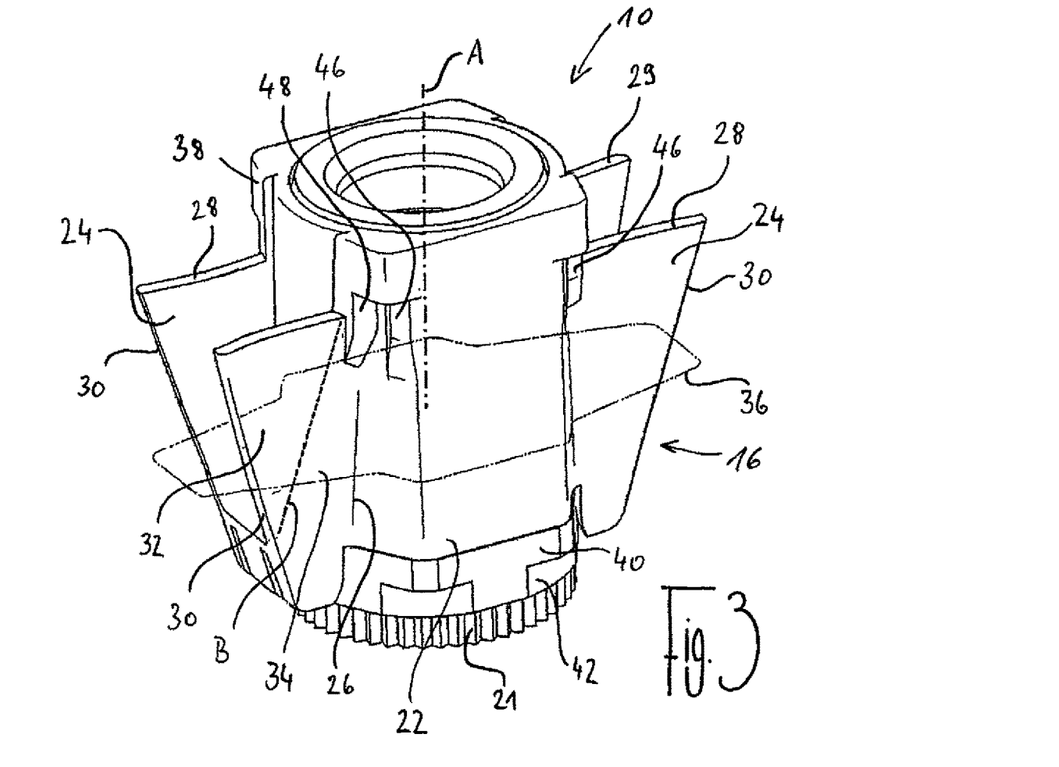
FIG. 3 a perspective view of the apparatus of FIG. 1.

It can be recognized with respect to FIGS. 1, 3, and 4 that the deflection line B extends from a region in which the support surface 29 of a support wall 24 projects from the base body 22 diagonally across the support wall 24 in the direction of its outer margin 30, with the deflection line B drawn only at one support wall 24 by way of example in FIG. 3. In other words, the spacing between the deflection line B and the outer margin 30 increases in the direction of the upper margin 28.

The spacing between the central longitudinal axis A and the outer margin 30 of each support wall 24 also increases in the direction of the upper margin 28; the support walls 24 are so-to-say flared upwardly.

Figure 2:
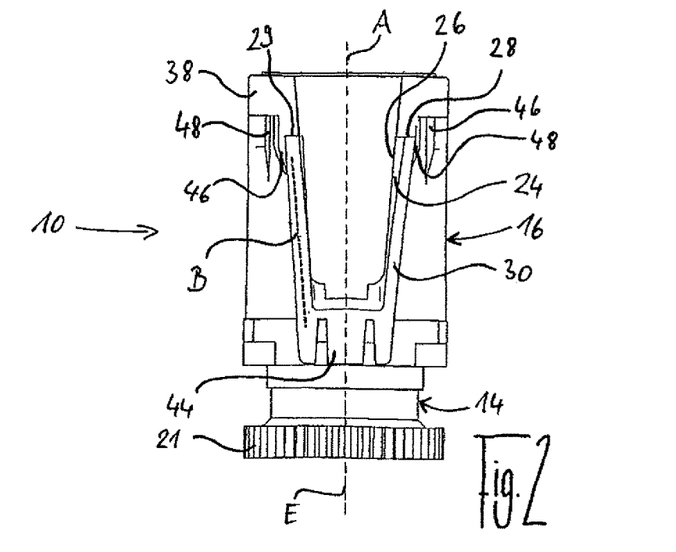
FIG. 2 a side view of the apparatus of FIG. 1.
Figure 5:
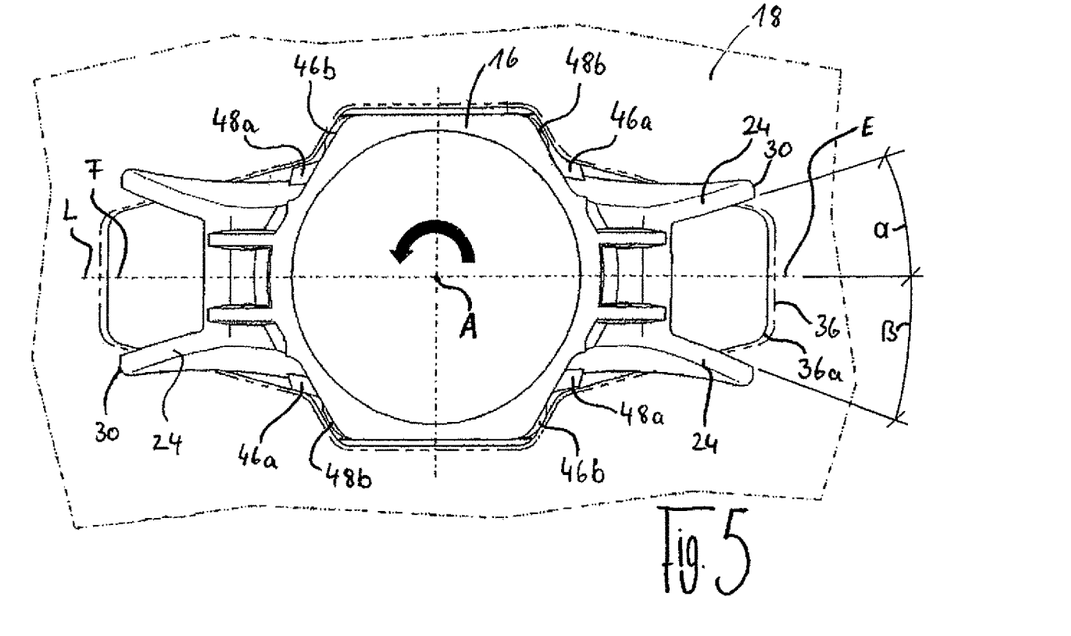
FIG. 5 a plan view of the lower side of a holding element of the apparatus of FIG. 1 that is received in a smaller cut-out.
Figure 6:
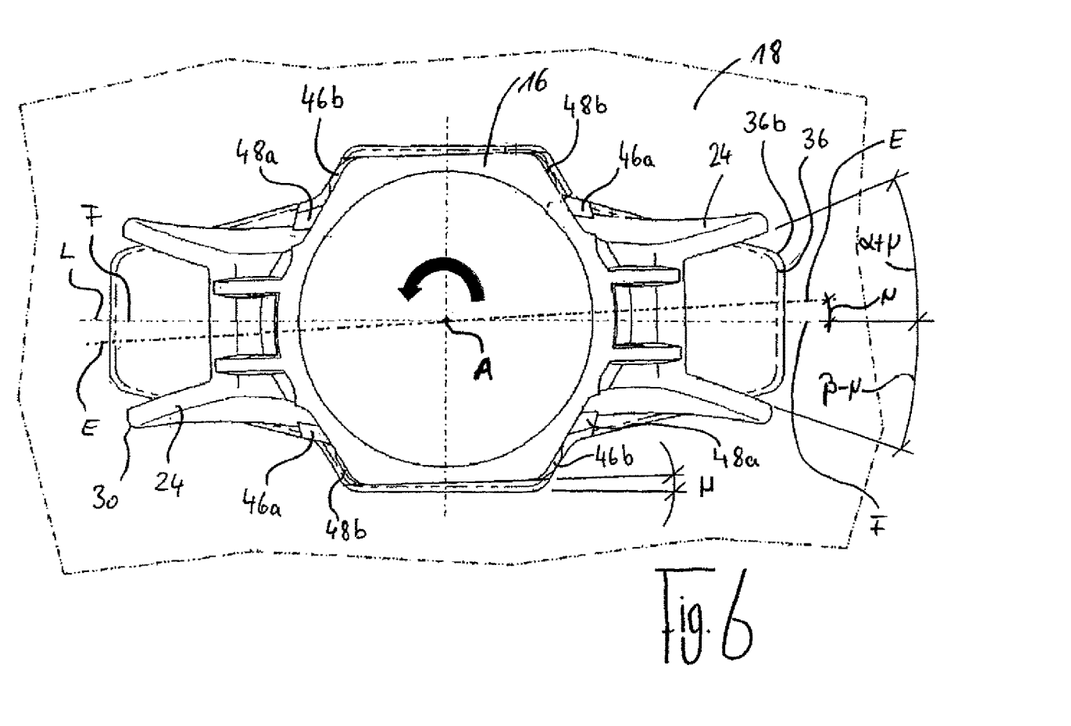
FIG. 6 a plan view of the lower side of a holding element of the apparatus of FIG. 1 that is received in a larger cut-out.

As FIG. 2 shows, the spacing between the support walls 24 of a pair of support walls 24 decreases downwardly in the direction of the stop washer 21. In other words, the support walls 24 of a pair run apart upwardly. In addition, the support walls 24 of each pair of support walls 24 are curved away from one another (FIG. 5 and FIG. 6).

FIG. 3 shows the apparatus 10 as it has been partly introduced into a cut-out 36 of the first component 18. Due to the decreasing spacing in the direction of the stop washer 21 between the support walls 24 of a pair of support walls 24, each pair of support walls 24 has an undersize with respect to the cut-out 36 in a region facing the stop washer 21 and has an oversize with respect to the cut-out 36 in a region remote from the stop washer 21, said effect being additionally amplified by the curvature of the support walls 24.

The apparatus 10 can accordingly be introduced into the cut-out 36 without force down to a depth in which the outer margins 30 of the support walls 24 come into contact with a margin of the first component 18 bounding the cut-out 36. From this point onward, a higher effort is required for the further introduction of the apparatus 10 since the further introduction of the apparatus 10 can only take place while pressing the support walls 24 together.

If the apparatus 10 is pressed further into the cut-out 36 while applying a force along the central longitudinal axis A in the direction of the second component 20, the deflection sections 32 of the support walls 24 are deflected against their return force along the deflection line B by the margin of the first component 18 bounding the cut-out 36, as the penetration of the apparatus 10 into the cut-out 36 progresses. In the present embodiment, this means that the deflection sections 32 of a pair of support walls 24 are moved toward one another on the introduction of the apparatus 10 into the cut-out 36, whereas the outer margins 30 of the support walls 24 slide along the margin of the first component 18 bounding the cut-out 36.

Two forces thus substantially have to be overcome on the clipping of the apparatus 10 into the cut-out 36, namely a friction force between the outer margins 30 of the support walls 24 and the margin of the first component 18 bounding the cut-out 36, on the one hand, and the return force of the deflection sections 32, on the other hand. The maximum sum of these forces preferably does not exceed more than 40 to 50 N, which corresponds to a typically tolerable force with a one-hand installation. In this respect, the force to be applied for the deflection of the deflection sections 32 decreases degressively as the penetration depth of the apparatus 10 into the cut-out 36 increases since a lever length by which the deflection sections 32 are deflected becomes larger and larger in the direction of the upper margin 32 due to the diagonal deflection line B.

After passing through the cut-out 36, the deflection sections 32 return into their original positions of rest as a consequence of the return force and engage behind the marginal region of the first component 18 bounding the cut-out 36, i.e. the apparatus 10 is now clipped into the first component 18.

FIG. 4 shows the apparatus 10 after the clipping into the first component 18 and in a final installation state in which both the support walls 24 are supported at the lower side of the first component 18 and the compensation element 14 is unscrewed from the base element 12 and is supported against the second component 20 by the stop washer 21.

For the axial securing of the first component 18 to the holding element 16, radially outwardly projecting protrusions 38 are provided at the base body 22 that are axially spaced apart from the support surface 29 of the support walls 24 and that form a mount for the first component 18 together with the support walls 24.

The protrusions 38 are formed at an end of the holding element 16 remote from the second component 20, and indeed in the form of four projecting shoulders that are arranged offset from the support walls 24 evenly distributed around the base body 22. It is understood that the protrusions 38 can, however, generally also be aligned with the support walls 24, i.e. can be arranged directly above them. The number of protrusions can moreover differ from four.

A radially projecting collar 40 that runs around in the circumferential direction is formed in an end region of the base element 12 facing the second component 20 (FIG. 1). The collar 40 has recesses 42 at a side facing the second component 20 that are distributed in the circumferential direction and that extend radially inwardly from an outer side of the collar 40 so that a section of the collar 40 remote from the second component 20 projects with respect to the recesses 42.

As can be seen with reference to the sectional representation of FIG. 4, the recesses 42 serve for the reception of latch projections 44 of the holding element 16 that are respectively formed facing the second component 20 between two support walls 24.

The holding element 16 is additionally secured against an axial displacement relative to the base element 12 by the latch projections 44 that engage into the recesses 42.

As already mentioned, the compensation element 14 can be unscrewed from the base element 12 by a rotation around the central longitudinal axis A, which can effect a rotation of the apparatus 10 in the cut-out 36 of the first component 18, in particular when a hole pattern of the cut-out 36 differs due to production from a standard hole pattern. The rotation of the apparatus 10 is in this respect the larger, the larger the actual cut-out 36a, 36b is with respect to a cut-out 36 having a standard dimension (FIG. 5 and FIG. 6).

A set of first rotational boundary surfaces 46 is formed at the holding element 16 to bound the rotation of the apparatus 10 about the central longitudinal axis A caused by the unscrewing of the compensation element 14. A set of second rotational boundary surfaces 48 is moreover provided that bound a rotation of the apparatus 10 in the opposite direction.

Each set of rotational boundary surfaces 46, 48 comprises one pair of rotational boundary surfaces 46a, 48a that are formed in direct proximity of the support walls 24 and one pair of rotational boundary surfaces 46b, 48b that are formed remote from the support walls 24. The pairs of rotational boundary surfaces 46b, 48b that are formed remote from the support walls 24 have different dimensions viewed outwardly from the base body 22, with the pair of rotational boundary surfaces 46b that is associated with the set of first rotational boundary surfaces 46 being dimensioned outwardly larger than the pair of rotational boundary surfaces 48b that is associated with the set of second rotational boundary surfaces 48.

Both sets of rotational boundary surfaces 46, 48 are formed between the support walls 24 and the protrusion 38 viewed in the direction of the central longitudinal axis A. Since the first component 18 is received between the support walls 24 and the projection 38 in the clipped-in state of the apparatus 10, the rotational boundary surfaces 46, 48 can abut the margin of the first component 18 bounding the cut-out 36 on a rotation of the apparatus 10.

FIG. 5 and FIG. 6 show the holding element 16 received in the cut-out 36 from below, i.e. from the perspective of the second component 20 viewed in the direction of the schematically shown first component 18. The actual cut-out 36a (solid line) is smaller than the cut-out 36 having a standard dimension (dashed line) in FIG. 5, whereas the actual cut-out 36b (solid line) is larger than the cut-out 36 having a standard dimension (dashed line) in FIG. 6.

If the actual cut-out 36a is smaller than the cut-out 36 having a standard dimension (FIG. 5), both sets of rotational boundary surfaces 46, 48 contribute to a correct alignment of the support walls 24 on the introduction of the apparatus 10 into the cut-out 36 so that an overlap is present between the support walls 24 and the first component 18 that is as large as possible in the assembled state of the apparatus 10.

On the unscrewing of the compensation element 14 from the base element 12, the holding element 16 rotates counterclockwise due to the perspective in FIGS. 5 and 6 from below and the set of first rotational boundary surfaces 46 abuts the first component 18, whereby the rotational movement of the holding element 16 is bounded.

As can be recognized with reference to FIG. 5, the support walls 24 of a pair of support walls 24 are aligned at different angles $\alpha$, $\beta$ to a plane E that includes the central longitudinal axis A and that extends centrally between the origins 26 of the support walls 24. In the situation shown in FIG. 5, the plane E coincides with a plane F that is spanned by a longitudinal axis L of the cut-out 36 and the central longitudinal axis A since the actual cut-out 36a is smaller than a cut-out 36 having a standard dimension and therefore does not permit any significant rotation of the holding element 16.

As FIG. 6 shows, the angle $\beta$, disposed after the angle $\alpha$ as viewed in the direction of rotation, is larger than the angle $\alpha$, with the difference between the angle $\alpha$ and the angle $\beta$ defining a difference angle $\mu$. The angles $\alpha$, $\beta$ between the support walls 24 and the plane E are here equal to the angles $\alpha$, $\beta$ between the support walls 24 and the plane F.

Due to the asymmetrical alignment of the support walls 24 to the plane F, the support wall 24, that is aligned at the larger angle $\beta$, has a larger overlap with the first component 18. The support wall 24, that is aligned at the smaller angle $\alpha$, in contrast has a smaller overlap with the first component 18.

If the apparatus 10 is seated in a cut-out 36b that is larger than a cut-out 36 having a standard dimension, a greater rotation of the holding element 16 is possible, with the rotation being restricted by the set of first rotational boundary surfaces 46 to the difference angle $\mu$.

A rotation of the holding element 16 by the difference angle $\mu$ also effects a rotation of the support walls 24 by the same angle. The plane E is consequently also rotated with respect to the plane F by the difference angle $\mu$. The angle $\beta$ between the one support wall 24 and the plane F is thereby reduced by the difference angle $\mu$, whereas the angle $\alpha$ between the plane F and the other support wall 24 increases by the difference angle μ so that as a result both support walls 24 have an overlap of approximately the same size with the inner surface of the first component 18.

The examples shown in FIG. 5 and FIG. 6 are extreme positions of the holding element 16 in the cut-out 36 that can occur with a maximum negative difference and a maximum positive difference of the actual cut-out 36*a*, 36*b* from the cut-out 36 having a standard dimension. The rotation of the holding element 16 can naturally be smaller than the angle μ with corresponding dimensions of the actual cut-out 36*a*, 36*b*.

Figure 7:
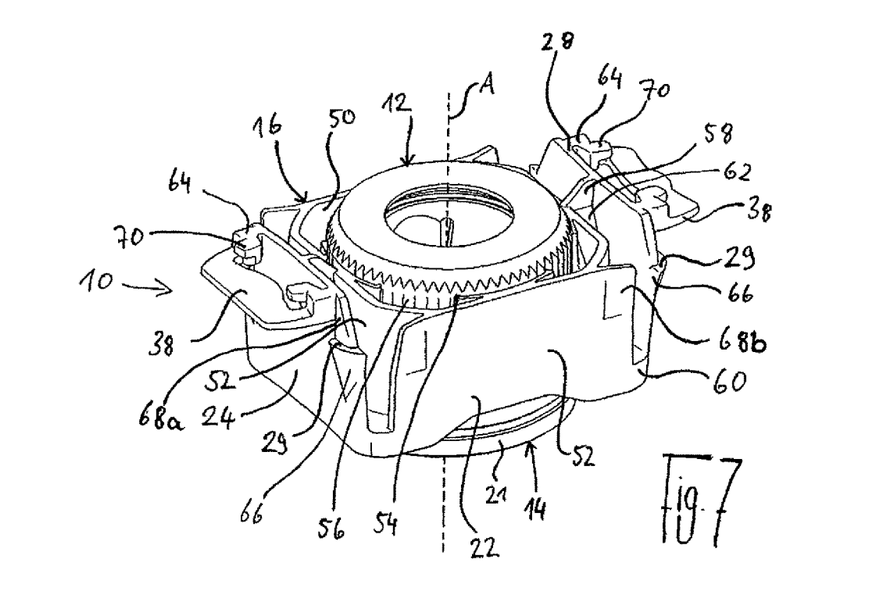
FIG. 7 a perspective view of an apparatus in accordance with a second embodiment.

FIG. 7 shows a second embodiment of the apparatus 10 in accordance with the invention that comprises a base element 12, a compensation element 14, and a holding element 16 having a base body 22. The base element 12 and the compensation element 14 are equally in threaded engagement as in the first embodiment.

The base body 22 defines a frame 50 that comprises two pairs of mutually oppositely disposed frame walls 52. A respective pair of resiliently supported mandrels 54, that is here a total of four pairs of resiliently supported mandrels 54 (FIG. 8), is formed at the inner sides of the frame walls 52 facing the base element 12. The mandrels 54 serve for the rotationally secure fixing of the base element 12 at the holding element 16 in that the mandrels 54 are in engagement with a knurling 56, formed at a jacket surface of the base element 12, in the form of grooves extending in parallel with the central longitudinal axis A and clamp the base element 12 tight.

Figure 8:
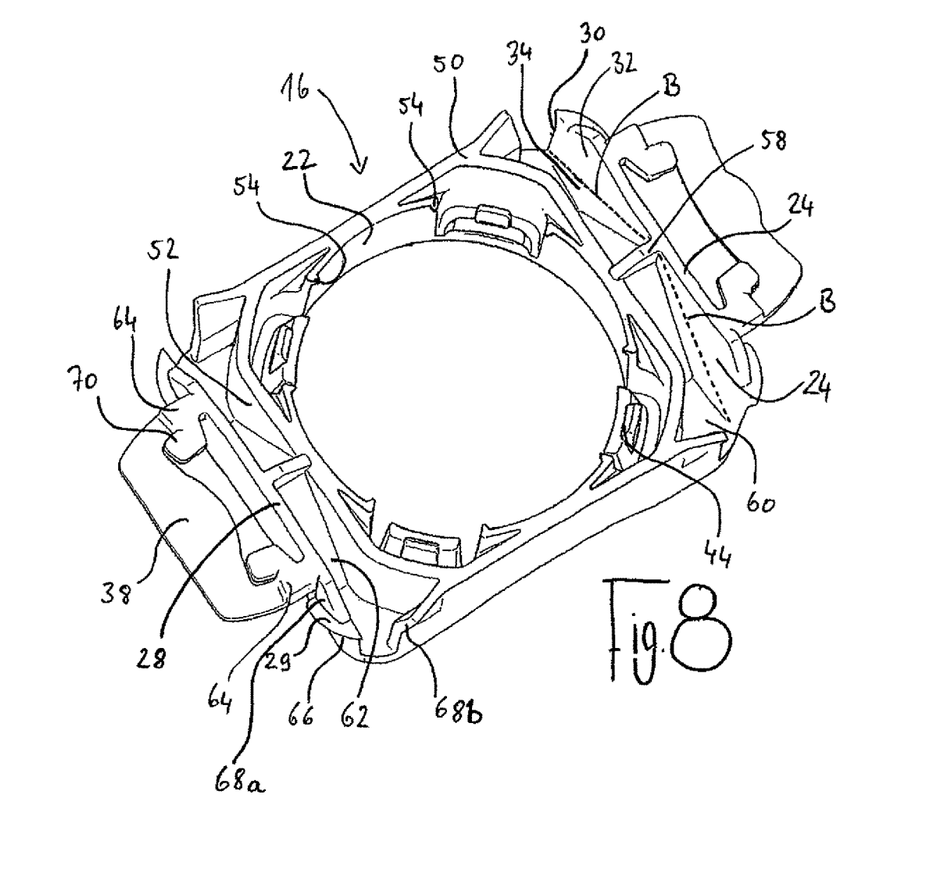
FIG. 8 a perspective view of a holding element of the apparatus of FIG. 7.

Four latch projections 44 for a latching with the base element 12 are additionally provided in corner regions of the frame 50 for the additional axial securing of the holding element 16 at the base element 12 (FIG. 8).

It is understood that the number of pairs of resiliently supported mandrels 54 and the number of latch projections 44 can respectively differ from four and the pairs of resiliently supported mandrels 54 and the latch projections 44 can also be attached at different points. A different kind of fastening of the base element 12 to the holding element 16 such as by adhesive bonding is moreover also conceivable in principle.

As FIG. 8 shows, a respective support wall 24 that is spaced apart substantially in parallel is associated with the frame walls 52 of one of the pairs of oppositely disposed frame walls 52 and is connected to the respective frame wall 52 by a web 58 in a region adjacent to an upper margin 28 of the support wall 24 and by a console 60 in a region facing the second component 20. The web 58 extends in parallel with the central longitudinal axis A and is centrally attached to the frame wall 52 and to the support wall 24. The console 60 in contrast extends over the total width of the support wall 24.

Each support wall 24 forms two mutually remote deflection sections 32 that face away from the web 58 and that are respectively separated from a rigid section 34 by a deflection line B. Each deflection line B extends, starting from the web 58, diagonally across the support wall 24 in the direction of a region of an outer margin 30 of the support wall 24 facing the second component 20.

To increase the stiffness of the rigid sections 34, each console 60 forms stiffening sections 62 that start from the web 58 and that extend diagonally outwardly in the direction of the second component 20, with the pitches of the stiffening sections 62 being steeper than the pitches of the diagonally extending deflection lines B.

A prolongation 64 extends outwardly away from the base element 12 from each deflection section 32 of a support wall 24 in the region of the upper margin 28 of the support wall 24. The prolongations 64 of a support wall 24 merge into a protrusion 38 connecting the prolongations 64.

Two counter-bearings 66 are furthermore formed at each support wall, and indeed in the respective region of the outer margins 30 of the deflection sections 32, that project increasingly outwardly in the direction of the upper margin 28. The counter-bearings 66 are axially spaced apart from the projection 38 in the direction of the second component 20 and form, together with the projection 38, a mount for the first component 18.

Each support wall 24 is moreover outwardly curved in the direction of its two outer margins 30 starting from the web 58. Each support wall 24 thereby has a certain oversize in the region of its outer margins 30 with respect to a cut-out 36, not shown here, of the first component 18 in the state of the apparatus 10 not clipped to the first component 18. In the clipped-in state of the apparatus 10 at the first component 18, each support wall 24 resiliently presses against a margin of the first component 18 at least sectionally between the prolongations 64 and the counter-bearings 66 to there define a set of first positioning surfaces 68*a* that contribute to the positioning of the apparatus 10 in the cut-out 36.

In addition, those frame walls 52 that extend at least approximately perpendicular to the support walls 24 form a set of second resilient positioning surfaces 68*b* in the region of their corners facing the support walls 24 and remote from the second component 20 to position the apparatus 10 in the cut-out 36. The set of second positioning surfaces 68*b* is located, viewed in the direction of the central longitudinal axis A, at a level that is disposed between the protrusion 38 and the counter-bearing 66 so that the set of second positioning surfaces 68*b* presses against the margin of the first component 18 bounding the cut-out 36 in the assembled state of the apparatus 10.

Since both the set of first positioning surfaces 68*a* and the set of second positioning surfaces 68*b* press against the margin of the first component 18 bounding the cut-out 36, they contribute to the radial positioning of the apparatus 10 and also ensure a sufficient overlap between the support surfaces 29 and the first component 18 with cut-outs 36 suffering from tolerances.

On the clipping of the apparatus 10 into the cut-out 36 of the first component 18, the counter-bearings 66 come into contact with the margin of the first component 18 bounding the cut-out 36 from a specific depth onward. While applying a force onto the apparatus 10 along the central longitudinal axis A in the direction of the second component 20, the apparatus 10 is pressed further into the cut-out 36, whereby the deflection sections 32 are deflected via the counter-bearings 66 against the return force of the deflection sections 32. In the present embodiment, this means that the two deflection sections 32 of the support wall 24 are deflected in the direction of the frame wall 52 on the introduction of the apparatus 10 into the cut-out 36, while the counter-bearings 66 slide along the margin of the first component 18 bounding the cut-out 36.

In this respect, the force to be applied for the deflection of the deflection sections 32 decreases degressively as the penetration depth of the apparatus 10 into the cut-out 36 increases since a lever length by which the deflection sections 32 are deflected becomes larger and larger in the direction of the upper margin 32 due to the diagonal deflection line B.

After passing through the cut-out 36, the deflection sections 32 and thus also the counter-bearings 66 formed thereat return in the direction of their original locations of rest due to the return force of the deflection sections 32 so that the support walls 24 press at least sectionally against the marginal region of the first component 18 bounding the cut-out 36 and the support surfaces 29 of the counter-bearings 66 engage behind the marginal region of the first component 18 bounding the cut-out 36.

A respective engagement feature 70 is formed at the prolongations 64 for the dismantling of the apparatus 10 clipped into the first component 18; it serves, with the aid of a tool, not shown, for example a pair of pliers, to deflect the deflection sections 32 against their return force so that the apparatus 10 can be pulled out of the cut-out 36 again.

The protrusion 38 is outwardly widened to serve as a protection so that the tool does not damage the first component 18 on the dismantling of the apparatus 10.

REFERENCE NUMERAL LIST 10 apparatus
12 base element
14 compensation element
16 holding element
18 first component
20 second component
21 stop washer
22 base body
24 support wall
26 origin
28 upper margin
29 support surface
30 outer margin
32 deflection section
34 rigid section
36 cut-out
38 protrusion
40 collar
42 recesses
44 latch projection
46 set of first rotational bounding surfaces
48 set of second rotational bounding surfaces
50 frame
52 frame wall
54 mandrel
56 knurling
58 web
60 console
62 stiffening section
64 prolongation
66 counter-bearing
68 positioning surfaces
70 engagement feature
α angle
β angle
μ difference angle
A central longitudinal axis
B deflection line
E plane
F plane
L longitudinal axis

The invention claimed is:

1. An apparatus for compensating tolerances between a first component and a second component, the apparatus comprising:
   a base element that defines a central longitudinal axis;
   a compensation element in threaded engagement with the base element; and
   a holding element fixedly connected to the base element for holding the apparatus at the first component wherein the holding element comprises a base body, wherein at least one support wall extends from a peripheral surface of the base body and has an upper margin remote from the second component in a state of the apparatus held at the first component, the at least one support wall comprising a deflection section that is deflectable against a return force along a deflection line that is not oriented perpendicular to the central longitudinal axis and that extends, starting from a region in which the upper margin projects from the base body, diagonally across the at least one support wall in the direction of an outer margin of the at least one support wall.

2. The apparatus in accordance with claim 1, wherein the outer margin has a component of extent in parallel with the central longitudinal axis, and wherein the outer margin and the deflection line are spaced apart from one another.

3. The apparatus in accordance with claim 1, wherein the spacing between the outer margin and the deflection line increases in the direction of the upper margin.

4. The apparatus in accordance with claim 1, wherein the outer margin does not extend in parallel with the central longitudinal axis.

5. The apparatus in accordance with claim 4, wherein a spacing between the outer margin and the central longitudinal axis increases in the direction of the upper margin.

6. The apparatus in accordance with claim 1, wherein two support walls form a pair of support walls spaced apart from one another in the peripheral direction of the base body.

7. The apparatus in accordance with claim 6, wherein one pair of support walls is provided at each of oppositely disposed sides of the base body.

8. The apparatus in accordance with claim 6, wherein a spacing between the support walls of the pair of support walls increases in the direction of the upper margin.

9. The apparatus in accordance with claim 6, wherein a spacing between the support walls of the pair of support walls increases outwardly, starting from the base body.

10. The apparatus in accordance with claim 6, wherein the support walls of the pair of support walls are curved away from one another.

11. The apparatus in accordance with claim 6, wherein the support walls of a pair of support walls are oriented at different angles to a plane that includes the central longitudinal axis and extends centrally between origins of the support walls at the base body, with the one angle being smaller by a difference angle than the other angle.

12. The apparatus in accordance with claim 1, wherein a set of first rotational bounding surfaces is provided at the holding element to bound to a predetermined angle a rotation about the central longitudinal axis of the apparatus received in a cut-out of the first component that is caused by the unscrewing of the compensation element from the base element.

13. The apparatus in accordance with claim 12, wherein the support walls of a pair of support walls are oriented at different angles to a plane that includes the central longitudinal axis and extends centrally between origins of the support walls at the base body, wherein the different angles comprise a first angle and a second angle, with the first angle being smaller by a difference angle than the second angle, and wherein the predetermined angle at least approximately corresponds to the difference angle and the first angle is positioned in front of the second angle viewed in the direction of rotation.

14. The apparatus in accordance with claim 1, wherein a set of second rotational bounding surfaces is provided at the holding element to bound a rotation of the apparatus received in a cut-out of the first component about the central longitudinal axis in a direction that is opposite to a rotational movement caused on the unscrewing of the compensation element from the base element.

* * * * *